(12) United States Patent
Hildenbrand et al.

(10) Patent No.: US 8,101,673 B2
(45) Date of Patent: *Jan. 24, 2012

(54) SILICA-CONTAINING UV-CROSSLINKABLE HARDCOAT COATINGS COMPRISING URETHANE ACRYLATES

(75) Inventors: Karlheinz Hildenbrand, Krefeld (DE); Peter Capellen, Krefeld (DE); Eberhard Koch, Burscheid (DE)

(73) Assignee: Bayer MaterialScience AG, Leverkusen (DE)

( * ) Notice: Subject to any disclaimer, the term of this patent is extended or adjusted under 35 U.S.C. 154(b) by 291 days.

This patent is subject to a terminal disclaimer.

(21) Appl. No.: 12/354,226

(22) Filed: Jan. 15, 2009

(65) Prior Publication Data

US 2009/0252884 A1    Oct. 8, 2009

(30) Foreign Application Priority Data

Jan. 16, 2008   (DE) .................. 10 2008 004 622

(51) Int. Cl.
 *C08F 2/50* (2006.01)
 *C08J 3/28* (2006.01)
 *B29C 35/08* (2006.01)

(52) U.S. Cl. ............... 522/96; 522/71; 522/74; 522/77; 522/79; 522/84; 522/90; 522/113; 522/114; 522/120; 522/178; 522/173; 522/174; 522/182; 264/494; 264/495; 264/496; 523/300

(58) Field of Classification Search .............. 522/71, 522/74, 77, 90, 96, 113, 114, 120, 130, 173, 522/174, 178, 182; 264/494, 495, 496; 523/300
See application file for complete search history.

(56) References Cited

U.S. PATENT DOCUMENTS

| | | | |
|---|---|---|---|
| 3,782,961 A | 1/1974 | Takahashi et al. | |
| 4,225,695 A | 9/1980 | Schuster et al. | |
| 4,383,057 A | 5/1983 | Yamamoto et al. | |
| 4,499,217 A | 2/1985 | Yoshimura et al. | |
| 7,420,005 B2 * | 9/2008 | Hojo et al. | ............ 522/81 |
| 2003/0129385 A1 * | 7/2003 | Hojo et al. | ............ 428/323 |
| 2004/0068025 A1 | 4/2004 | Baumgart et al. | |
| 2004/0191420 A1 | 9/2004 | Rearick et al. | |
| 2005/0203202 A1 | 9/2005 | Ramsey | |
| 2006/0157675 A1 | 7/2006 | Hasskerl et al. | |
| 2008/0102262 A1 | 5/2008 | Esaki et al. | |
| 2009/0017306 A1 * | 1/2009 | Hildenbrand et al. | ......... 428/412 |
| 2010/0285321 A1 * | 11/2010 | Hildenbrand | ............ 428/442 |

FOREIGN PATENT DOCUMENTS

| | | |
|---|---|---|
| DE | 1644798 | 9/1970 |
| DE | 2115373 | 10/1971 |
| DE | 2737406 A1 | 2/1979 |
| DE | 10311639 A1 | 9/2004 |
| EP | 0050996 A1 | 5/1982 |
| EP | 0337695 A2 | 10/1989 |
| EP | 0505737 A1 | 9/1992 |
| GB | 1159551 | 7/1969 |
| JP | 61-181809 A | 8/1986 |
| JP | 2001-19874 A | 1/2001 |
| JP | 2003-034761 A | 2/2003 |
| JP | 2003-145689 A | 5/2003 |
| JP | 2004-277596 A | 10/2004 |
| JP | 2005-179539 A | 7/2005 |
| JP | 2007-010829 A | 1/2007 |
| JP | 2007-313872 A | 12/2007 |
| WO | WO-03/000813 A1 | 1/2003 |
| WO | WO-2006/048277 A1 | 5/2006 |
| WO | WO-2006/049008 A1 | 5/2006 |
| WO | WO-2006/049296 A1 | 5/2006 |

\* cited by examiner

*Primary Examiner* — Sanza McClendon
(74) *Attorney, Agent, or Firm* — Connolly Bove Lodge & Hutz LLP

(57) ABSTRACT

The present invention relates to a UV-crosslinkable composition comprising a) unmodified, protonated silica nanoparticles; b) urethane acrylate; c) polar solvent; and d) UV initiator system, wherein the amount by weight of unmodified, protonated silica nanoparticles exceeds the content of urethane acrylate and is at least 50.1 wt. %, based on the dry weight of the coating, to the use of the composition in the coating of substrates, and to substrates coated with such formulations.

14 Claims, No Drawings

SILICA-CONTAINING UV-CROSSLINKABLE HARDCOAT COATINGS COMPRISING URETHANE ACRYLATES

RELATED APPLICATIONS

This application claims benefit to German Patent Application No. 10 2008 004 622.1, filed Jan. 16, 2008, which is incorporated herein by reference in its entirety for all useful purposes.

BACKGROUND OF THE INVENTION

The present invention relates to a UV-crosslinkable composition comprising
 a) unmodified, protonated silica nanoparticles;
 b) urethane acrylate;
 c) polar solvent; and
 d) UV initiator system,
wherein the amount by weight of unmodified, protonated silica nanoparticles exceeds the content of urethane acrylate and is at least 50.1 wt. %, based on the dry weight of the coating, to the use of the composition in the coating of substrates, and to substrates coated with such formulations.

The principle of improving the properties of coatings by the integration of silica (silicon dioxide) has been known for a relatively long time. It is thereby possible, by adding silica particles, to improve coatings in respect of, for example, abrasion, scratch resistance, thermal deformability, reflection properties, gloss, antistatics, flammability, UV resistance, anti-fog properties, wettability with water and resistance to chemicals. If silica is used in the form of nanoparticles (particle sizes smaller than 100 nm), it should in principle be possible for these improvements in properties to be achieved while the transparency is at the same time retained, or is diminished only slightly. As is shown by the following literature citations, it has not hitherto been possible to combine all these property features, or even a relatively great combination of these features, in a surface-coating system. The latter is an object of the present application.

Accordingly, there has been no lack of attempts in the past to provide silica-containing coating compositions having further improved overall properties in respect of the above features.

DE 103 11 639 A1 describes moulded bodies provided with antistatic properties and a process for their production. In order to achieve the object, there are described in this connection surface-coating systems comprising acrylate-containing binders, alcoholic solvents, nano-scale electrically conductive metal oxides, nano-scale inert particles such as silicon dioxide and, optionally, further additives such as, for example, dispersing aids. The mean particle size of the inert nanoparticles used is from 2 nm to 100 nm, the particles being used in amounts of from 0.1 wt. % to 50 wt. %, based on the dry film.

JP 61-181809 discloses a UV-curable composition for coatings having good adhesion properties and high abrasion resistance, comprising α,β-unsaturated carboxylic acids and colloidal silicon dioxide particles, dispersed in water or low-valency alcohols.

JP 2005-179539 describes anti-fog coatings comprising from 20 wt. % to 99 wt. % of a mixture consisting of from 0 wt. % to 80 wt. % fine particles, for example silicon dioxide, and from 100 wt. % to 20 wt. % of a plastics material, as well as from 0.5 wt. % to 30 wt. % of a sulfosuccinate having two anionic substituents.

Surface-coating compositions based on polyfunctional acrylic acid esters for the production of coatings having high transparency, stability to weathering and scratch resistance are described in EP 0 050 996. In addition to the mentioned acrylic acid derivatives, the compositions comprise a polymerisation initiator as well as inorganic fillers such as, for example, silicon dioxide having mean particle diameters of from 1 nm to 1 μm and having a refractive index of from 1.40 to 1.60.

U.S. Pat. No. 4,499,217 describes anhydrous surface-coating compositions comprising colloidal silicon dioxide having mean particle diameters of from 10 μm to 50 μm and heat-curing compounds, for example acrylic compounds. The cured coatings exhibit good abrasion resistance as well as good adhesion to substrates.

JP 2001-019874 discloses compositions comprising (poly)ethylene glycol (poly)methyl methacrylate, acrylamides, photoinitiators, dispersing aids and silica for the production of coatings having good adhesion and increased scratch resistance.

WO 2006/049008 describes a hydrophilic coating based on silica particles which are suspended in a high-boiling solvent, such as N,N-dimethylacetamide; an alcoholic solution of a non-ionic surfactant (L-77) is added to the suspension, and tempering is then carried out for 10 minutes at 100° C. The coating yields a hydrophilic surface, it being possible to achieve wetting angles of 20° or less with water. This process is used in the coating of spectacle lenses in respect of anti-fog properties. However, these conditions are not suitable for the coating of plastics substrates owing to their sensitivity to the solvents used here.

A pourable formulation consisting of a mixture of an organic solution of polyvinyl-butyral and an alcoholic suspension of colloidal silica is described in U.S. Pat. No. 4,383,057. Based on dry weight, the composition can consist of from 20 wt. % to 95 wt. % polyvinylbutyral and from 80 wt. % to 5 wt. % silica. With regard to improving the stability values, such as scratch resistance, resistance to chemicals and inflammability, the polymer polyvinylbutyral is crosslinked, for which purpose there are used, for example, methylolmelanines modified with alkyl ethers. No further information is given regarding surface properties, such as hydrophilicity or water wetting angles. As compared with the present application, these are not UV-crosslinkable formulations.

If, as described in WO 2006/048277, surfaces with particularly high and dense silica structures are to be produced, the deposition of silica is frequently effected locally by flame hydrolysis from silica precursors, for example from hexamethyldisilazane or tetraethoxysilane. The hydrophobic nature of such coatings can be enhanced further by the integration of fluoroallylsilanes.

EP 0 337 695 discloses silicon dioxide dispersions for the abrasion-resistant coating of solid, in particular transparent, substrates. The dispersions comprise colloidal silicon dioxide having particle sizes smaller than 100 nm, preferably smaller than 75 nm, particularly preferably smaller than 50 nm, dispersed in a protically substituted ester or amide of an acrylic or methacrylic acid. From 0.1 to 2.5 parts by weight of silicon dioxide are employed per part by weight of unsaturated monomer that is used. The dispersions can be cured on suitable substrates by UV radiation after addition of a photoinitiator.

EP 0 505 737 describes UV-crosslinkable acrylate systems comprising methacrylate-functionalised colloidal silica nanoparticles. In addition to excellent weathering properties, the corresponding surface coatings exhibit good abrasion values, for example Taber haze of 6-8% after 500 cycles. The methacrylate-functionalised silica nanoparticles are products prepared from methacryloylpropyltrimethoxysilane and colloidal silica nanoparticles. Acrylate-modified silica nanoparticles have in the meantime also become available commercially, for example under the name "Nanocryl" from Nanoresins or "Highlink Nano" from Clariant.

These products, which are supplied as anti-scratch and anti-abrasion additives, are not very narrowly defined in terms of their properties owing to the complex chemistry.

It is an object of the present invention, therefore, to provide highly transparent hardcoat systems which have very good scratch resistance, abrasion values and weathering properties, while at the same time having low haze, and which adhere very well to various substrates. The haze, determined by the haze (H) values in accordance with ASTM 1003-00, should be less than 1% H, preferably less than 0.6% H. The abrasion values, determined in accordance with ASTM 1003-00, should be less than 12% H, preferably less than 8% H, particularly preferably less than 6% H, after 1000 abrasion cycles. The adhesion, determined by the cross-cut method, should exhibit ISO values of less than 2, preferably less than 1 and particularly preferably 0. These surface-coating properties should be retained in particular even after a boiling test of several hours, for example from 2 to 4 hours in boiling water, storage in water at elevated temperature for a prolonged period, as well as after weathering tests, for example artificial illumination/weathering in the Xenon-WOM (Weather-Ometer®) in accordance with ASTM G 26, G 151 or G 155. In addition, it should be possible to achieve as many as possible of the properties mentioned at the beginning, such as anti-fog, antistatic, hydrophilicity and resistance to chemicals, in the coatings according to the invention.

In particular for hardcoat systems having hydrophilic surface properties which exhibit the property profile according to the object, there continues to be an increased need, as compared with the prior art, for the provision of suitable formulations.

In addition, it should be possible to use these surfaces as a primer layer for further coatings, in particular from aqueous solutions which comprise, for example, cationic compounds.

It has been found, surprisingly, that most of the desired requirement profiles can be achieved to a high degree with the system according to the invention.

EMBODIMENTS OF THE INVENTION

An embodiment of the present invention is a UV-crosslinkable composition comprising:
a) unmodified, protonated silica nanoparticles;
b) a urethane acrylate;
c) a polar solvent; and
d) a UV initiator system,
wherein the amount by weight of said unmodified, protonated silica nanoparticles exceeds the amount by weight of said urethane acrylate and is present in an amount of at least 50.1 weight %, based on the total dry weight of the composition.

Another embodiment of the present invention is the above composition, wherein said urethane acrylate is an unsaturated aliphatic urethane acrylate.

Another embodiment of the present invention is the above composition, further comprising a OH-functional reactive diluent.

Another embodiment of the present invention is the above composition, wherein said polar solvent is an alcohol or an amidic solvent.

Another embodiment of the present invention is the above composition, wherein said urethane acrylate is a urethane acrylate having more than 30 carbon atoms.

Another embodiment of the present invention is the above composition, wherein the ratio of the parts by weight of said urethane acrylate to said unmodified, protonated silica nanoparticles is in the range of from 25:75 to 45:55.

Another embodiment of the present invention is the above composition, wherein the ratio of the parts by weight of said urethane acrylate to said unmodified, protonated silica nanoparticles is in the range of from 30:70 to 40:60.

Another embodiment of the present invention is the above composition, wherein said urethane acrylate is aliphatic.

Yet another embodiment of the present invention is a process for preparing the above composition, comprising
i) preparing a suspension comprising unmodified, protonated silica nanoparticles;
ii) mixing a urethane acrylate, a UV initiator system, and a polar solvent in the absence of light; and
iii) mixing the suspension of i) with the mixture of ii) in the absence of light.

Another embodiment of the present invention is the above process, wherein i) comprises in the range of from 5 to 80 weight % unmodified, protonated silica nanoparticles and ii) comprises in the range of from 5 to 60 weight % of a urethane acrylate and in the range of from 0.1 to 10 weight % of a UV initiator system in polar solvent.

Yet another embodiment of the present invention is a method for coating surfaces, comprising applying the above composition to a surface and irradiating said composition applied to said surface with UV light.

Yet another embodiment of the present invention is a moulded body coated with the above composition.

Yet another embodiment of the present invention is a moulded body comprising a coating comprising colloidal silica, a crosslinked acrylate, and a UV initiator.

Another embodiment of the present invention is the above method, further comprising applying a cationic or zwitterionic compound to the surface.

DESCRIPTION OF THE INVENTION

The present invention therefore relates to a UV-crosslinkable composition comprising
a) unmodified, protonated silica nanoparticles;
b) urethane acrylate;
c) polar solvent; and
d) UV initiator system,
wherein the amount by weight of unmodified, protonated silica nanoparticles exceeds the content of urethane acrylate and is at least 50.1 wt. %, based on the dry weight of the coating.

Component a), the unmodified silica nanoparticles, is protonated silicon dioxide nanoparticles (silica nanoparticles) which are dispersed in polar, preferably organic, solvents and, owing to the free SiOH groups, have an acidic pH value. In particular, they are spherical $SiO_2$ particles having diameters of from 1 nm to about 100 nm, preference being given to the use of particles having particle sizes smaller than 50 nm, particularly preferably smaller than 30 nm. It is also possible to use mixtures of silica nanoparticles having different particle sizes.

Such silica nanoparticles are supplied in various particle sizes in the form of a dispersion in polar organic solvents by various companies, such as Nissan or Clariant. For example, Nissan supplies particle sizes from 10 nm to 100 nm in various polar solvents, such as methanol, isopropanol, ethylene glycol, methyl ethyl ketone, methyl isobutyl ketone, propylene glycol, ethylene glycol n-propyl ether, propylene glycol monomethyl ether acetate or N,N-dimethylacetamide.

A silica nanoparticle dispersion that is preferably used is the type Organosilikasol® IPA ST from Nissan. It is a 30 wt. % silica dispersion in isopropanol; the particle sizes are from 10-15 nm, the water content is given as <1%, the viscosity is <15 mPas, the specific density is specified at 0.98-1.02 and the pH value at 2-4. It is also readily possible to transfer silica dispersions that are available per se into a different dispersing medium by distillative solvent exchange or by membrane processes. For example, the type Organosilikasol® IPA ST just mentioned can readily be transferred to a diacetone alcohol (DAA)-based dispersion by adding diacetone alcohol (DAA, 4-hydroxy-4-methyl-2-pentanone) and distilling off the lower boiling isopropyl alcohol.

Another silica nanoparticle dispersion from Clariant that is preferably used has the name HIGHLINK® Nano G 401 and has the following specifications: particle size: 13 nm, $SiO_2$ content: 30 wt. % and viscosity<100 mPas; density: 1.1 g/cm$^3$, the dispersing medium is ethylene glycol n-propyl ether (propyl glycol) and the pH value, according to our own measurements, is 4.

In addition to protonated silica particles in polar organic solvents, NALCO also supplies, under the name Nalco® 1034A, water-based, protonated silica particles having a particle size of 20 nm and a pH value of 3.

The organically based silica nanoparticle dispersions just described can also easily be prepared in the laboratory starting from aqueous, alkali-stabilised silica nanoparticle dispersions. The aqueous, alkali-stabilised silica dispersions are extremely inexpensive, readily available products which are supplied in different particle sizes by various manufacturers, for example under the product names Levasil®, Ludox® or Nalco®. These alkali-stabilised dispersions have a pH value of from 9 to 10 and are unsuitable in that form for the formulations according to the invention because of their water content and their high pH value. However, as is described in the following example, they can be converted in an elegant manner into the corresponding protonated form in polar organic solvents with the aid of cation exchangers and distillative solvent exchange:

To 500.00 g of Levasil 300®/30% (aqueous, Na+ stabilised silica nanoparticle suspension, 30 wt. %, 300 m$^2$/g, pH 10, H.C. Starck, Germany) there were added 250 g of Lewatit S 100® (acidic cation exchanger in H form). The suspension was stirred for 1 hour by means of a magnetic stirrer, and then the ion exchanger was separated off by filtration over a paper filter. 100.00 g of diacetone alcohol (DAA, 4-hydroxy-4-methyl-2-pentanone) were added to the filtrate.

Water was distilled off by means of a rotary evaporator at a reduced pressure of about 15-20 mbar. When 300 ml of distillate had been obtained, a further 200.00 g of diacetone alcohol were added and concentration was further carried out in vacuo. The process of concentration by evaporation was carried out, monitored by solids content analysis, until a 30 wt. % suspension in diacetone alcohol was obtained. The water content, determined by Karl Fischer, was 3.8 wt. %.

The scope of the present invention does not include silica-containing formulations in which deprotonated, alkali-stabilised aqueous suspensions having pH values greater than 7 are used. Likewise not claimed are chemically modified, for example acrylate-modified, silica modifications which can be prepared, for example, by reaction of colloidal silica with methacryloylpropyltrimethoxysilane (EP 0 505 737).

The ratio of silica to urethane acrylate is important for the present invention. It has been found, as described in Example 3b, that markedly poorer values in respect of haze and abrasion were obtained in the case of coatings having relatively low silica contents, for example 35 wt. % silica, based on dry film weight. Accordingly, in the formulations according to the invention, the silica content exceeds the content of urethane acrylate, so that the content of silica in the dried coating is at least 50.1 wt. % or more.

Component b), the urethane acrylates, is reaction products of (meth)acrylic acids, polyols and polyfunctional isocyanates. Urethane acrylates are prepared from alcohols containing (meth)acryloyl groups, and di- or poly-isocyanates. Preparation processes for urethane acrylates are known in principle and are described, for example, in DE-A-1 644 798, DE-A 2 115 373 or DE-A-2 737 406. Alcohols containing (meth)acryloyl groups are to be understood as being both esters, containing a free hydroxyl group, of acrylic acid or methacrylic acid with dihydric alcohols, such as, for example, 2-hydroxyethyl, 2- or 3-hydroxypropyl or 2-, 3-, 4-hydroxybutyl(meth)acrylate, and any desired mixtures of such compounds. In addition, there come into consideration also monohydric alcohols containing (meth)acryloyl groups, or reaction products consisting substantially of such alcohols, which are obtained by esterification of n-hydric alcohols with (meth)acrylic acid and optionally further dicarboxylic acids, it being possible to use as alcohols also mixtures of different alcohols, so that n represents an integer or a fractional number in the statistical mean of from greater than 2 to 4, preferably 3, and wherein n−1 mol of (meth)acrylic acid is particularly preferably used per mole of the mentioned alcohols.

It is also possible to use reaction products of such monohydric alcohols containing (meth)acryloyl groups with epsilon-caprolactone. Preference is given to the reaction products of hydroxyalkyl(meth)acrylates with epsilon-caprolactone.

Suitable di- or poly-isocyanates are in principle (cyclo) aliphatic, araliphatic and aromatic compounds, (cyclo)aliphatic compounds preferably being, for example, hexamethylene diisocyanate or isophorone diisocyanate, trimethylhexamethylene diisocyanate, di(isocyanatocyclohexyl)methane or derivatives thereof having a urethane, isocyanurate, allophanate, biuret, uretdione structure, and mixtures thereof.

These are marketed commercially, for example, by Bayer MaterialScience under the product name Desmolux®.

Because of the many different structural forms of the available polyfunctional isocyanates and polyols, customised products having adjustable product properties are available. For example, increased acrylate contents and accordingly high crosslinking densities can be established by way of higher functional polyols. By choosing suitable polyfunctional (generally di- or tri-functional) isocyanates, properties such as light resistance or flexibility, for example, can be influenced. Such urethane acrylates are usually soluble in organic solvents, such as alcohols or esters. However, by using very hydrophilic polyol components, for example ethoxylated units, it is also possible to prepare products that are dispersible in water. For example, such a product is obtainable under the name Desmolux® KPP 11 376.

Depending on the choice of individual structural units, the Desmolux® urethane acrylates can have different molecular weights, which are preferably in the range from 200 to 3000 g/mol, particularly preferably in the range from 300 to 1000 g/mol. The Desmolux® urethane acrylate systems are supplied solvent-free or in combination with so-called reactive diluents. Reactive diluents are, by definition, diluents which become a constituent of the binder in the process of curing the coating. They are low molecular weight polyfunctional acrylates, hexanediol diacrylate (HDDA) being the most frequently used product. In addition to HDDA, hydrophilic reactive diluents, such as dipropylene glycol diacrylate (DPGDA) or tripropylene glycol diacrylate (TPGDA), are also supplied in the Desmolux® product series. Further examples of hydrophilic, or surfactant-like, acrylates are polyethylene glycol 600 diacrylate, nonylphenol(EO)$_x$ acrylate or isobornyl acrylate. Further information on reactive diluents, as well as general background information regarding radiation-curing surface-coating systems, is to be found in P. Garrat, "Strahlenhärtung", Vincentz, Hanover 1996.

Starting from the solvent-free urethane acrylate Desmolux® U 100 (unsaturated aliphatic urethane acrylate, without reactive diluent, viscosity at 23° C.: 7500+/−2000 mPas, hydroxyl content: about 0.3, Bayer MaterialScience AG, Germany), it has now been found, as described in Example 1, wholly surprisingly, that the property profile of the coating can be improved enormously, in particular in respect of abrasion behaviour and resistance to solvents, by the addition of unmodified, protonated silica nanoparticles (a precise description of this test method is given in the Examples). For example, a surface coating of conventional Desmolux® U 100 on polycarbonate substrates (e.g. Makrolon® M 2808) exhibits a high haze value of over 40% haze after only 100 abrasion cycles, whereas it was possible with the corresponding silica-containing formulations to obtain coatings having low abrasion values of less than 5% haze. However, these coatings, similarly to conventional Desmolux® surface coatings, still exhibited low stability to solvents. It was possible to achieve a drastic improvement in these disadvantages (stability to solvents and chemicals) by using the urethane acrylates in combination with the reactive diluent hexanediol diacrylate (HDDA). However, a further limiting surface-coating property was found in the long-term test (boiling test, a more precise description will be found in the Examples). While both the adhesion and the transparency of the surface-coating layer withstood a 4-hour boiling test in water (100° C.) without being damaged, hairline cracks were noticeable with a magnifying glass after a boiling test of about 1.5 hours. It has now been found, wholly surprisingly, that these disadvantages (hairline crack formation) can be suppressed by using OH-functional reactive diluents, for example pentaerythritol triacrylate (PETA) or dipentaerythritol penta/hexaacrylate (DPHA), or a mixture of the two, in combination with Desmolux® U 100. The urethane acrylate Desmolux® U 100 that is preferably used is a reactive-diluent-free UV- and electron-beam-curing surface coating having the following specifications: viscosity at 23° C.: 7500+/−2000 mPas, acid number: <2 mg KOH/g, hydroxyl content: about 0.3%, density: 1.13 g/ml and ignition point: >100° C.

Accordingly, the preferred formulations of the present invention comprise urethane acrylates, protonated silica nanoparticles in polar solvents, reactive diluents and UV initiators, the urethane acrylates preferably being aliphatic and the reactive diluents preferably being OH-functional.

As compared with the prior art, such formulations yield coatings which exhibit improved properties in respect of availability of the raw materials, mechanical properties, such as abrasion and scratch resistance, optical properties, such as transmission, or haze, and yellowness index YI, as well as stability to chemicals and solvents. Further novel properties are obtained in the case of formulations in which the content of silica nanoparticles exceeds the binder content. Properties such as reduced electrostatics or, as described in Example 4b, affinity to water-soluble cationic compounds, for example cationic polyelectrolytes, can be achieved as a result of increased hydrophilicity.

There is a wide range of possible choices for component c), the polar solvent, too. The main criterion is that both the silica nanoparticles and the binder are compatible in the same solvent or solvent mixture. As already described in the section "commercially available silica nanoparticles", there are suitable in particular alcohols, such as methanol, ethanol, isopropanol, ethylene glycol, propylene glycol (1,2-propanediol), propyl glycol (ethylene glycol n-propyl ether), methoxypropanol (MOP, 1-methoxy-2-propanol) or diacetone alcohol (4-hydroxy-4-methyl-2-pentanone), ketones, such as acetone, methyl ethyl ketone, methyl isobutyl ketone, esters, such as ethyl acetate, butyl acetate and propylene glycol monomethyl ether acetate, ethers, such as ethylene glycol n-propyl ether, tetrahydrofuran, as well as amidic solvents, such as N,N-dimethylacetamide or N-methylpyrrolidone. Of course, solvent mixtures can also be used, it also being possible for small amounts of solvents that are not themselves suitable in pure form, such as toluene, to be present.

There is likewise a wide range of possible choices for component d), the photoinitiators, and the coating additives. With regard to photoinitiators, a wide range of products is described in CIBA's company brochure "Photoinitiators for UV Curing". These are systems which, in the air or under inert gas, initiate the polymerisation of the (meth)acrylate components when irradiated with UV light. Such systems, which are conventionally added in an amount of several wt. % (approximately from 2 to 10), based on the amount of acrylate used, are obtainable, for example, under the product names Irgacure® or Darocure®. Mixtures, such as, for example, Irgacure 184/Darocure TPO, are frequently also used. Irgacure 184® is hydroxy-cyclohexyl phenyl ketone and Darocure TPO® is diphenyl-(2,4,6-trimethylbenzoyl)-phosphine oxide.

Suitable as typical coating additives are so-called flow improvers, such as BYK® additives, surfactants, such as Aerosol® OT, Dapro® U 99 or non-ionic surfactants, such as Pluronic PE 6400 or Surfynol 465. In addition, UV light stabilising systems, such as triazoles in combination with sterically hindered amines, can be present as constituents of the formulation.

With regard to substrates, the greatest advantages with the formulations according to the invention are achieved in the case of thermoplastic articles. However, considerable improvements in properties can also be produced in the case of other substrates, such as wood, ceramics, leather, metal, textiles or glass. The silica-containing coatings according to the invention can be of great interest in particular in the case of substrates such as prisms, lenses or spectacle lenses, which are to have light-refracting functions. Accordingly, there are applications, for example in respect of "antireflex" properties or IR reflection, where a sequence of high- and low-refractive layers is of interest. Because of the low refractive index (n) of silica of about 1.45, as compared with that of polycarbonate of 1.56, the formulations according to the invention having high silica contents are suitable as a low-refractive layer for such applications. For example, as described in Example 5, it has surprisingly been found that the coatings according to the invention having high silica contents can achieve refractive index values which are markedly below the value of the pure binder system.

Because of the excellent "transparent protective properties" of the novel surface-coating systems, however, transparent substrates are preferred. Most particular preference is given to transparent thermoplastic polymers, for example of polycarbonate (Malrolon®, Apec®) or polycarbonate blends (Malcroblend®, Bayblend®), polymethyl methacrylate (Plexiglas®), polyesters, cycloaliphatic olefins, such as Zeonor®, and glass.

Polycarbonates for the compositions according to the invention are homopolycarbonates, copolycarbonates and thermoplastic polyester carbonates.

The polycarbonates and copolycarbonates generally have mean molecular weights (weight-average) of from 2000 to 200,000, preferably from 3000 to 150,000, especially from 5000 to 100,000, most particularly preferably from 8000 to 80,000, in particular from 12,000 to 70,000 (determined by GPC with polycarbonate calibration).

For the preparation of polycarbonates for the compositions according to the invention, reference may be made, for example, to "Schnell", Chemistry and Physics of Polycarbonates, Polymer Reviews, Vol. 9, Interscience Publishers, New York, London, Sydney 1964, to D. C. PREVORSEK, B. T. DEBONA and Y. KESTEN, Corporate Research Center, Allied Chemical Corporation, Morristown, N.J. 07960, "Synthesis of Poly(ester)carbonate Copolymers" in Journal of Polymer Science, Polymer Chemistry Edition, Vol. 19, 75-90 (1980), to D. Freitag, U. Grigo, P. R. Müller, N. Nouvertne, Bayer AG, "Polycarbonates" in Encyclopedia of Polymer Science and Engineering, Vol. 11, Second Edition, 1988, pages 648-718, and finally to Dres. U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299. The preparation is preferably carried out by the interfacial process or the melt transesterification process.

Preference is given to homopolycarbonates based on bisphenol A and copolycarbonates based on the monomers bisphenol A and 1,1-bis-(4-hydroxy-phenyl)-3,3,5-trimethylcyclohexane. These or other suitable bisphenol compounds are reacted with carbonic acid compounds, in particular phosgene or, in the case of the melt transesterification process, diphenyl carbonate or dimethyl carbonate, to form the respective polymers.

The layer thicknesses of the coatings according to the invention are usually in the range from 0.5 to 500 µm, preferably from 1 to 50 µm and most particularly preferably from 2 to 25 µm. In the case of layers having light-refracting functions, markedly lower values, for example in the range from 50 to 500 nm, preferably from 100 to 250 nm, are additionally of interest.

With regard to the application of the coatings, the methods known per se, such as flood coating, knife application, application via single- or multi-roller systems, spraying or spin coating, are suitable.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Before the test procedures are described, the substrates for application of the surface coatings and the corresponding test methods will first be described.

Substrates:

Substrate 1: Makrolon® M 2808 sheet (bisphenol A polycarbonate: medium-viscosity bisphenol A polycarbonate, MFR 10 g/10 min according to ISO 1133 at 300° C. and 1.2 kg, without UV stabilisation and mould-release agent).

Substrate 2: Makrolon® Al 2647 sheet (medium-viscosity bisphenol A polycarbonate with UV stabiliser and mould-release agent; MFR 13 g/10 min according to ISO 1133 at 300° C. and 1.2 kg).

Test Methods:

Layer thickness: By means of white light interferometer (ETA SPB-T, ETA-Optik GmbH).

Adhesion: According to DIN EN ISO 2409: cross-cut test. A cross-cut rating of 0, for example, means that all the cut edges are completely smooth and none of the cross-cut squares has flaked off. Cross-cut 5: All the cross-cut squares have flaked off.

Haze: The haze is determined according to ASTM D 1003-00 by means of wide-angle light scattering. The values are given in % Haze (H), low values, for example 0.5% H, meaning low haze, that is to say high transparency.

Abrasion test: The wear resistance (abrasion) is determined by means of abrasive disk methods by the increase in scattered light. A model 5151 Taber abrader with CS-10F Calibrase abrasive disks (type IV), with an applied weight of 500 g per disk, was used. The haze values are measured, for example, after 500 or 1000 cycles, low values, for example 0.5% H, meaning good abrasion resistance.

Yellowness index (YI): The YI test is a measure of the yellowing of the test sample by UV light. Low values, for example YI:0.5, mean a low degree of yellowing.

Long-Term Stability and Weathering Tests

With regard to long-term stability, the above-mentioned test criteria are determined, for example, under the following stress conditions:

Storage in water: The sample is stored for 10 days in water at a temperature of 65+/−2° C., according to ASTM 870-02, the above-mentioned tests being carried out daily.

Boiling test: The samples are placed in boiling water, the above-mentioned values being determined after 0.5, 1, 2, 3 and 4 hours. If the 4-hour boiling test is passed without damage, good long-term stability can be predicted.

Weathering: As compared with the natural test, accelerated determination of the stability of materials to light/weathering is carried out. The most important climatic factors (radiation, heat, moisture, rain) can be simulated by so-called Weather-Ometers®. For example, the so-called Xenon WOM according to ASTM G 155 and the Xenon High Energy test according to DIN EN ISO 4892-2 are carried out.

Example 1

Urethane Acrylate without Reactive Diluent with and without Silica a) without silica 30.0 g of Desmolux® U 100
1.2 g of Irgacure® 184
0.3 g of Darocure® TPO and
94.5 g of methoxypropanol (MOP, 1-methoxy-2-propanol) were dissolved, with stirring, and filtered through a 3 µm paper filter.

b) with silica 10.0 g of Desmolux U 100 (Bayer MaterialScience)
44.2 g of 1-methoxy-2-propanol (MOP, KMF)
0.4 g of Irgacure 184 (CIBA)
0.1 g of Darocure TPO (CIBA) and
65.8 g of Highlink 401-31 (silica nanoparticles, 30 wt. % in propyl glycol, Clariant)

were homogenised by stirring, filtered over a 3 μm paper filter and introduced into a dark bottle.

Coating of the Substrates:

Substrates 1 (PC M 2808) and 2 (Al 2647) of dimensions 10×15 cm were flood coated with pourable solutions 1a) and 1b). The solvent was evaporated off for 10 minutes at 80° C. in a drying cabinet.

UV Crosslinking:

The coated substrates were subjected to UV crosslinking (Hg lamp, about 1 J/cm$^2$).

Calculated silica content in the dry film: 65 wt. %.

The results are shown in the following table for comparison:

| Substrate: 1 (M 2808) | Urethane acrylate without silica: 1a) | Urethane acrylate with silica: 1b) |
|---|---|---|
| Layer thickness (μm)* | 1.7–4.9 | 1.2–4.0 |
| % Haze | 8.3 | 0.18 |
| % Haze after 1000 cycles | >50 | 6.39 |
| Adhesion (cross-cut test) | 0 | 0 |
| Cross-cut test (adhesion) after 4-hour boiling test | 0 | 0 |
| Acetone resistance** | Swells considerably with acetone | Swells considerably with acetone |

*The layer thickness gradient is the result of the flood coating process, which gives an increasing layer thickness from top to bottom.
**The resistance to solvents was tested by rubbing the surface of the coating with a swab impregnated with acetone and was assessed visually.

Both surface coatings were applied to substrates 1 and 2, no substantial differences being noted within the accuracy of measurement, so that only the results of substrate 1 are shown. This comparison shows that substrate 2 (Al 2647), which in itself is more difficult to coat, even with the silica formulation, exhibits very good adhesion and long-term stability.

The results shown in the table can be interpreted as follows:
% Haze: The silica-containing coating surprisingly and advantageously exhibits a lower haze value than the corresponding silica-free version.
% Haze after 1000 cycles: The silica-containing coating exhibits markedly better, that is to say lower, abrasion values than the silica-free surface-coating layer.
Adhesion and boiling test: Excellent adhesion and long-term stability are found in both cases. That is to say, the good adhesion to plastics substrates, known for crosslinked urethane acrylates, is not adversely affected by the high silica content.
Neither coating exhibits great resistance to solvents according to the acetone test.

Example 2

Urethane Acrylate with Reactive Diluent HDDA with and without Silica a) without silica
18.0 g of Desmolux® U 100
2.0 g of hexanediol diacrylate (HDDA, Aldrich)
63.2 g of diacetone alcohol (4-hydroxy-4-methyl-2-pentanone, Acros)
0.8 g of Irgacure 184® and
0.2 g of Darocure TPO®
were homogenised by stirring, filtered over a 3 μm paper filter and introduced into a dark bottle.
b) with silica
8.0 g of Desmolux® U 100
2.0 g of hexanediol diacrylate (HDDA, Aldrich)
53.2 g of Highlink® 401-31 (silica nanoparticles 63 wt. % in n-propyl glycol, Clariant)
42.0 g of diacetone alcohol
0.4 g of Irgacure 184® and
0.1 g of Darocure TPO®
were dissolved as described under a).

Coating and UV crosslinking: As in Example 1.

Calculated silica content in the dry film: 65 wt. %.

The results are shown in the following table for comparison:

| Substrate: 1 (M 2808) | 2a: Urethane acrylate/ HDDA without silica | 2b: Urethane acrylate/ HDDA with silica |
|---|---|---|
| Layer thickness (μm)* | 1.7–4.9 | 1.3–3.7 |
| % Haze | 0.55 | 0.31 |
| % Haze after 1000 cycles | 44.2 | 5.39 |
| Adhesion (cross-cut test) | 0 | 0 |
| Cross-cut test (adhesion) after 4-hour boiling test | 0 | 0, hairline cracks after 1.5 hour boiling test |
| Acetone resistance** | Does not swell with acetone | Does not swell with acetone |

*The layer thickness gradient is the result of the flood coating process, which gives an increasing layer thickness from top to bottom.
**The resistance to solvents was tested by rubbing the surface of the coating with a swab impregnated with acetone and was assessed visually.

Both surface coatings were applied to substrates 1 and 2, no substantial differences being noted within the accuracy of measurement, so that only the results of substrate 1 are shown. This comparison shows that substrate 2 (Al 2647), which in itself is more difficult to coat, even with the silica formulation, exhibits very good adhesion and long-term stability.

The results shown in the table can be interpreted as follows:
% Haze: The silica-containing coating surprisingly and advantageously exhibits a lower haze value than the corresponding silica-free version.
% Haze after 1000 cycles: The silica-containing coating exhibits markedly more advantageous (lower) abrasion values than the silica-free surface-coating layer.
Adhesion and boiling test: Excellent adhesion and long-term stability are found in both cases. That is to say, the good adhesion to plastics substrates, known for crosslinked urethane acrylates, is not adversely affected by the high silica content. However, hairline cracks formed in the silica-containing formulation 2b) after 1.5 hours of boiling test.
Both coatings exhibit good resistance to solvents according to the acetone test.

Example 3

Urethane Acrylate with OH-Containing Reactive Diluent and Silica

3a: Silica content: 65 wt. %
6.0 g of dipentaerythritol penta/hexaacrylate (DPHA, Aldrich)
72.0 g of 1-methoxy-2-propanol (MOP, KMF)
9.0 g of Desmolux U 100®
0.6 g of Irgacure 184®
0.15 g of Darocure TPO® and
122.5 g of Highlink® 401-31 (Clariant)
were homogenised by stirring, filtered over a 3 μm paper filter and introduced into a dark bottle.

Coating of the substrates and UV crosslinking: As Example 1
  Calculated silica content in the dry film: 70 wt. %
  The results are shown in the following table:

|  | Example 3a: Urethane acrylate/ OH-functional reactive diluent/high silica content |
|---|---|
| Layer thickness (μm)* | 1.3-3.6 |
| % Haze | 0.18 |
| % Haze after 1000 cycles | 4.89 |
| Adhesion (cross-cut test) | 0 |
| Cross-cut test (adhesion) after 4-hour boiling test | 0, no crack formation |
| Acetone resistance | Does not swell |

*The layer thickness gradient is the result of the flood coating process, which gives an increasing layer thickness from top to bottom.
**The resistance to solvents was tested by rubbing the surface of the coating with a swab impregnated with acetone and was assessed visually.

Both surface coatings were applied to substrates 1 and 2, no substantial differences being noted within the accuracy of measurement, so that only the results of substrate 1 are shown. This comparison shows that substrate 2 (Al 2647), which in itself is more difficult to coat, even with the silica formulation, exhibits very good adhesion and long-term stability.

The results shown in the table can be interpreted as follows:
  % Haze: The silica-containing coating surprisingly and advantageously exhibits a very low haze value.
  % Haze after 1000 cycles: The low value of less than 5% H indicates a coating having excellent abrasion resistance.
  Adhesion and boiling test: Excellent adhesion and long-term stability are found in both cases. That is to say, the good adhesion to plastics substrates, known for crosslinked urethane acrylates, is not adversely affected by the high silica content. Compared with the boiling test of Example 2, no defects in the surface coating, such as crack formation, were discernible even after 4 hours' boiling.
  Both coatings exhibit very good resistance to solvents according to the acetone test.
  3b: Silica content: 35 wt. %
6.0 g of dipentaerythritol penta/hexaacrylate (DPHA, Aldrich)
53.0 g of 1-methoxy-2-propanol (MOP, KMF)
9.0 g of Desmolux U 100®
0.6 g of Irgacure 184®
0.15 g of Darocure TPO® and
28.3 g of Highlink® 401-31 (Clariant)
were homogenised by stirring, filtered over a 3 μm paper filter and introduced into a dark bottle.
Coating of the substrates and UV crosslinking: As Example 1
  Calculated silica content in the dry film: 35 wt. %
  The results are shown in the following table:

|  | Example 3b: Urethane acrylate/ OH-functional reactive diluent/low silica content |
|---|---|
| Layer thickness (μm)* | 1.7-5.6 |
| % Haze | 3.45 |
| % Haze after 1000 cycles | 18.5 |
| Adhesion (cross-cut test) | 0 |
| Cross-cut test (adhesion) after 4-hour boiling test | 0, no crack formation |
| Acetone resistance | Swells with acetone |

As will be seen from the results, the surface coating having a reduced silica content exhibits considerably poorer values in respect of haze (% haze), abrasion resistance (% haze after 1000 cycles) and resistance to solvents.

If the results of Examples 1 to 3 are compared it will be seen that the test criteria listed in the table are all achieved simultaneously in the optimum manner when the formulations contain high silica contents and OH-functional reactive diluents in addition to urethane acrylate.

Example 4

Hydrophilic Hardcoat Coating with a Negatively Charged Surface and Anti-Fog Properties 4.0 g of pentaerythritol triacrylate (PETA, Aldrich)
6.0 g of Desmolux® U 100
0.4 g of Irgacure® 184
0.1 g of Darocure® TPO
71.2 g of Highlink® 401-31
1.0 g of Aerosol® OT (dioctyl sulfosuccinate Na, DSSNa, Cytec) and
136.0 g of 1-methoxy-2-propanol
were dissolved, with stirring, and filtered over a 3 μm paper filter.

Coating of the substrates and UV crosslinking were carried out by flood coating analogously to Example 1.
Calculated silica content in the dry film: 65 wt. %
Calculated surfactant (DSSNa) content in the dry film: 3 wt. %
The following surface-coating properties were determined:
Layer thickness: 0.9-2.0 μm
Haze %: 0.14
% Haze after 1000 cycles: 11.4
  4a: Determination of the Anti-Fog Properties
  Breathing: No mist was noticeable after the coated substrate surface was breathed on, whereas a surface clouded with condensed water vapour was obtained in the case of the comparison sample (coating from Example 3 without surfactant).
  Greenhouse test: The DSSNa-containing sample described in Example 4 was exposed for 6 hours in a mini greenhouse inside which a humidity of almost 100% had been established. A surfactant-free coating from Example 3 was used as comparison sample. While lasting cloudiness was immediately noticeable in the case of the comparison sample, the sample with the surfactant-containing coating from Example 4 remained absolutely transparent. After 6 hours' exposure, the sample was dried for 4 hours at 40° C. and again exposed to the high humidity for 6 hours. In this case too, no cloudiness was noticeable. These moist/dry cycles were repeated a total of 10 times, the transparency (anti-fog properties) being wholly retained in all cases.
  4b: Coating of the Hydrophilic, Negatively Charged Surface with Cationic Polymers According to the Polyelectrolyte Monolayer Concept A polycarbonate substrate with the coating from Example 4 was immersed for 10 minutes in the following 0.1% aqueous polymer solutions (cationic polyelectrolytes): polyallylamine hydrochloride (PAH), chitosan hydroacetate and polydiallyldimethylammonium hydrochloride (PDADMAC). The immersed surfaces were then rinsed with water and dried for 10 minutes at 80° C. in an air-circulating drying cabinet.

The function test in respect of adsorption of the cationic polyelectrolytes was carried out with the aid of 0.1% aqueous ionic dye solutions: The substrates modified with the cationic polyelectrolytes were immersed for about 1 minute in the negatively charged blue dye solution erioglaucine and then washed with water. A uniform blue colour could be detected. In the comparison test, the same substrates were immersed in the cationic blue dye methylene blue and washed. In this case, there was no colouration. In a further comparison test, the unmodified substrates from Example 4 (negatively charged surface) were immersed in the same dye solutions, whereupon the opposite effects could be observed: There was pronounced dyeing ability with the cationic dye solution methylene blue, while the anionic dye solution erioglaucine did not exhibit dyeing ability.

Example 5

Determination of the Refractive Index

5a: The formulation described in Example 3 with a silica content of 70 wt. % was applied to quartz glass specimen holders with the aid of a spin coater, layer thicknesses of about 300 nm being obtained. The refractive index value was determined in accordance with the method described in detail in BMS 06 1 073:

The transmission and reflection spectrum of the coating was measured with a spectrometer from STEAG ETA-Optik, CD-Measurement System ETA-RT and then the layer thickness and the spectral progression of n and k were adapted to the measured transmission and reflection spectra. This is effected by the internal software of the spectrometer and additionally requires the n and k data of the quartz glass substrate, which were determined beforehand in a blank measurement. k is dependent on the decay constant of the light intensity α as follows:

$$k = \frac{\lambda \cdot \alpha}{4\pi}$$

λ is the wavelength of light.

In the case of the silica-containing formulation from Example 8 (70 wt. % silica), a refractive index of 1.48 was determined at a wavelength of 750 nm.

5b: In the comparison test, a urethane acrylate coating without silica was prepared:

18.0 g of Desmolux® U 400 and 1.0 g of Irgacure® 184 were dissolved in 86.0 g of methoxypropanol and applied to quartz specimen holders analogously to Example 5a and investigated in respect of refractive index. A value n of 1.54 was determined at a wavelength of 750 nm.

The results show that the refractive index can be reduced considerably (by 0.06 units) by the high silica content.

Example 6

Silica-Containing Formulation with Desmolux® VP LS 2266 and the Reactive Diluent PETiA 6.0 g of pentaerythritol triacrylate (PETiA, Aldrich)
9.0 g of Desmolux® VPLS 2266 (Bayer MaterialScience)
0.6 g of Irgacure 184®
0.15 g of Darocure® TPO
99.0 g of Highlink® 401-31
0.27 g of dioctyl sulfosuccinate (DSSNa) and
68.0 g of 1-methoxy-2-propanol were mixed, with stirring, and filtered over a 3 μm paper filter.

Coating and UV crosslinking were carried out analogously to Example 1.

Calculated silica content in the dry film: 65 wt. %

Desmolux® VPLS 2266: Unsaturated aromatic epoxy acrylate, viscosity at 23° C.: 4500-8500 mPas, hydroxyl content: 1.8%, acid number: about 2 mg KOH/g The results are summarised in the following table in table form:

| Parameter | Example 6 |
|---|---|
| Layer thickness (μm)* | 1.7-3.7 |
| % Haze | 0.24 |
| % Haze after 1000 cycles | 7.9 |
| Adhesion (cross-cut test) | 0 |
| Cross-cut test (adhesion) after 4-hour boiling test | 0, no crack formation |
| Acetone resistance | Does not swell |

In this example, a urethane acrylate having a different composition as compared with Example 3 is present. Otherwise, the system comprises a high silica content and an OH-functional acrylate reactive diluent. Accordingly, the test criteria listed in the table are largely met in the optimum manner.

The invention claimed is:
1. A UV-crosslinkable composition comprising:
   a) unmodified, protonated silica nanoparticles;
   b) a urethane acrylate;
   c) a polar solvent; and
   d) a UV initiator system,
   wherein the amount by weight of said unmodified, protonated silica nanoparticles exceeds the amount by weight of said urethane acrylate and is present in an amount of at least 50.1 weight %, based on the total dry weight of the composition.
2. The composition of claim 1, wherein said urethane acrylate is an unsaturated aliphatic urethane acrylate.
3. The composition of claim 1, further comprising a OH-functional reactive diluent.
4. The composition of claim 1, wherein said polar solvent is an alcohol or an amidic solvent.
5. The composition of claim 1, wherein said urethane acrylate is a urethane acrylate having more than 30 carbon atoms.
6. The composition of claim 1, wherein the ratio of the parts by weight of said urethane acrylate to said unmodified, protonated silica nanoparticles is in the range of from 25:75 to 45:55.
7. The composition of claim 6, wherein the ratio of the parts by weight of said urethane acrylate to said unmodified, protonated silica nanoparticles is in the range of from 30:70 to 40:60.
8. The composition of claim 3, wherein said urethane acrylate is aliphatic.

9. A process for preparing the composition of claim 1, comprising i) preparing a suspension comprising unmodified, protonated silica nanoparticles;

ii) mixing a urethane acrylate, a UV initiator system, and a polar solvent in the absence of light; and iii) mixing the suspension of i) with the mixture of ii) in the absence of light.

10. The process of claim 9, wherein i) comprises in the range of from 5 to 80 weight % unmodified, protonated silica nanoparticles and ii) comprises in the range of from 5 to 60 weight % of a urethane acrylate and in the range of from 0.1 to 10 weight % of a UV initiator system in polar solvent.

11. A method for coating surfaces, comprising applying the composition of claim 1 to a surface and irradiating said composition applied to said surface with UV light.

12. A moulded body coated with the composition of claim 1.

13. A moulded body comprising a coating comprising colloidal silica, a crosslinked acrylate, and a UV initiator.

14. The method of claim 11, further comprising applying a cationic or zwitterionic compound to the surface.

* * * * *